(12) United States Patent
Kojima et al.

(10) Patent No.: US 10,526,960 B2
(45) Date of Patent: Jan. 7, 2020

(54) TURBOCHARGER

(71) Applicant: MITSUBISHI HEAVY INDUSTRIES ENGINE & TURBOCHARGER, LTD., Sagamihara-shi, Kanagawa (JP)

(72) Inventors: Yuya Kojima, Tokyo (JP); Takashi Nambu, Tokyo (JP); Naomichi Shibata, Tokyo (JP); Takaya Futae, Tokyo (JP); Shuichi Isayama, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 249 days.

(21) Appl. No.: 15/546,854

(22) PCT Filed: Sep. 14, 2015

(86) PCT No.: PCT/JP2015/076005
§ 371 (c)(1),
(2) Date: Jul. 27, 2017

(87) PCT Pub. No.: WO2017/046842
PCT Pub. Date: Mar. 23, 2017

(65) Prior Publication Data
US 2018/0003105 A1    Jan. 4, 2018

(51) Int. Cl.
*F02B 39/14* (2006.01)
*F01D 25/16* (2006.01)
(Continued)

(52) U.S. Cl.
CPC .............. *F02B 39/14* (2013.01); *F01D 25/16* (2013.01); *F02B 37/00* (2013.01); *F16C 17/18* (2013.01)

(58) Field of Classification Search
CPC .......... F02B 39/14; F02B 39/00; F02B 37/00; F01D 25/16; F05D 2220/40; F16C 17/18
(Continued)

(56) References Cited

U.S. PATENT DOCUMENTS 2,953,416 A * 9/1960 Collins ................. F01D 25/168
384/251
3,043,636 A * 7/1962 MacInnes ............. F01D 25/166
384/287
(Continued)

FOREIGN PATENT DOCUMENTS

JP   2007-285252 A   11/2007
JP   2010-169193 A    8/2010
(Continued)

OTHER PUBLICATIONS

International Search Report and Written Opinion of the International Searching Authority (Forms PCT/ISA/220, PCT/ISA/237 and PCT/ISA/210), dated Dec. 15, 2015, for International Application No. PCT/JP2015/076005, with an English translation of the Written Opinion.

*Primary Examiner* — Thai Ba Trieu
(74) *Attorney, Agent, or Firm* — Birch, Stewart, Kolasch & Birch, LLP

(57) ABSTRACT

A turbocharger according to an embodiment of the present invention includes a rotating shaft, a compressor, a turbine, a compressor-side floating bearing and a turbine-side floating bearing that rotatably support the rotating shaft, and a bearing housing that houses the compressor-side floating bearing and the turbine-side floating bearing, the bearing housing being internally provided with a turbine-side oil feeding passage through which oil to be fed to the turbine-side floating bearing flows and a compressor-side oil feeding passage through which oil to be fed to the compressor-side floating bearing flows. A ratio of an oil feeding pressure for
(Continued)

oil at an outlet of the compressor-side oil feeding passage to an oil feeding pressure for oil at an outlet of the turbine-side oil feeding passage is configured to be higher than 1.0 and lower than 1.5.

7 Claims, 9 Drawing Sheets

(51) Int. Cl.
*F02B 37/00* (2006.01)
*F16C 17/18* (2006.01)

(58) Field of Classification Search
USPC .......... 60/605.3; 417/407; 384/291, 286–287
See application file for complete search history.

(56) References Cited

U.S. PATENT DOCUMENTS

| | | | | |
|---|---|---|---|---|
| 3,058,787 | A * | 10/1962 | Bernson | F01D 25/166 384/287 |
| 4,370,106 | A * | 1/1983 | Lauterbach | F01D 25/16 384/126 |
| 4,371,219 | A * | 2/1983 | Yamane | F01D 25/166 384/291 |
| 4,640,630 | A * | 2/1987 | Yoshioka | F01D 25/164 384/129 |
| 2010/0196148 | A1* | 8/2010 | Gee | F01D 11/003 415/177 |
| 2012/0066908 | A1* | 3/2012 | Gutknecht | F01D 25/16 29/898 |
| 2014/0119898 | A1* | 5/2014 | Nishida | F02B 39/14 415/170.1 |
| 2016/0265542 | A1* | 9/2016 | Annati | F02B 37/00 |
| 2017/0009810 | A1* | 1/2017 | Futae | F02B 39/14 |

FOREIGN PATENT DOCUMENTS

| | | |
|---|---|---|
| JP | 2011-153668 A | 8/2011 |
| JP | 2013-2294 A | 1/2013 |
| JP | 2014-238010 A | 12/2014 |
| WO | WO 2011/143079 A2 | 11/2011 |

* cited by examiner (a)

(b)

TURBOCHARGER

TECHNICAL FIELD

This disclosure relates to a turbocharger, and in particular, to a turbocharger including a floating bearing as a bearing that supports a rotating shaft.

BACKGROUND

As a technique for improving output power of an engine, a method is known in which a turbocharger compresses intake air and feeds the compressed intake air to the engine (turbocharging), and this method is widely used for automotive engines and the like. A turbocharger normally includes a rotating shaft, a compressor provided on a first end side of the rotating shaft, and a turbine provided on a second end side of the rotating shaft. The turbocharger is configured to rotate the rotating shaft via a turbine using exhaust energy of exhaust gas, allowing a compressor to compress intake air.

In the turbocharger, the rotating shaft rotates at a very high speed, and thus, in general, a full-floating floating bearing in which the bearing itself rotates is provided on a turbine side and on a compressor side as described in Patent Document 1. In this floating bearing, a clearance between an inner diameter side of the floating bearing and the rotating shaft and a clearance between an outer diameter side of the floating bearing and a bearing housing are each filled with lubricant. The floating bearing can freely rotate between the rotating shaft and a center housing. An oil film is formed in the clearance between the rotating shaft and the floating bearing, and thus, the rotating shaft rotates while floating from the floating bearing.

The lubricant with which the clearances are filled is fed via an oil feeding passage formed in the center housing. The oil feeding passage includes an oil feeding passage through which the lubricant is fed toward the compressor-side floating bearing and an oil feeding passage through which the lubricant is fed toward the turbine-side floating bearing.

The lubricant fed via the oil feeding passages cools the rotating shaft via the compressor-side floating bearing and the turbine-side floating bearing. The lubricant having cooled the rotating shaft is discharged toward an oil drain outlet of the center housing.

CITATION LIST

Patent Literature

Patent Document 1: JP2007-285252A

SUMMARY

Technical Problem

In the turbocharger described in Patent Document 1, the turbine-side floating bearing, which may be affected by exhaust gas, transmits a larger amount of heat than the compressor-side floating bearing. Consequently, in order to cool the turbine-side floating bearing, the feed amount of lubricant flowing toward the turbine-side floating bearing is increased. Thus, the turbine-side oil feeding passage has a larger cross sectional area than the compressor-side oil feeding passage.

However, in spite of an increased feed amount of lubricant flowing toward the compressor-side floating bearing, the temperature of the lubricant fed to the compressor-side floating bearing is expected to be relatively lower than the temperature of the lubricant fed to the turbine-side floating bearing. Thus, the lubricant fed to the compressor-side floating bearing has a higher viscosity than the lubricant fed to the turbine-side floating bearing, subjecting the compressor-side oil feeding passage to an increased pressure loss. This may reduce a feed pressure for the lubricant fed to the compressor-side floating bearing. As a result, the compressor-side floating bearing may be seized.

At least one embodiment of the present invention is an invention based on the above-described situation of the related art. An object of the present invention is to provide a turbocharger that enables a reduction in the likelihood that the compressor-side floating bearing will be seized.

Solution to Problem (1) A turbocharger according to at least one embodiment includes:

a rotating shaft;

a compressor provided on a first end side of the rotating shaft;

a turbine provided on a second end side of the rotating shaft;

a compressor-side floating bearing that rotatably supports the rotating shaft;

a turbine-side floating bearing that rotatably supports the rotating shaft, the turbine-side floating bearing being arranged at a distance from the compressor-side floating bearing in an axial direction of the rotating shaft and arranged closer to the turbine than the compressor-side floating bearing in the axial direction of the rotating shaft; and a bearing housing that houses the compressor-side floating bearing and the turbine-side floating bearing, the bearing housing being internally provided with a turbine-side oil feeding passage through which oil to be fed to the turbine-side floating bearing flows and a compressor-side oil feeding passage through which oil to be fed to the compressor-side floating bearing flows.

A ratio of an oil feeding pressure for oil at an outlet of the compressor-side oil feeding passage to an oil feeding pressure for oil at an outlet of the turbine-side oil feeding passage is configured to be higher than 1.0 and lower than 1.5.

The turbocharger described above in (1) is configured such that the ratio of the oil feeding pressure at the outlet of the compressor-side oil feeding passage to the oil feeding pressure at the output of the turbine-side oil feeding passage is higher than 1.0 and lower than 1.5. Therefore, even when the oil flowing through the compressor-side oil feeding passage has a higher viscosity than the oil flowing through the turbine-side oil feeding passage, the feed amount of oil flowing through the compressor-side oil feeding passage can be increased. Therefore, the amount of oil flowing toward the compressor-side floating bearing increases to enable a reduction in the likelihood that the compressor-side floating bearing will be seized.

(2) In certain embodiments, in the turbocharger described above in (1), the compressor-side oil feeding passage at least includes a compressor-side oil feeding hole extending toward the compressor-side floating bearing, and the turbine-side oil feeding passage at least includes a turbine-side oil feeding hole extending toward the turbine-side floating bearing. The compressor-side oil feeding hole is configured to have a larger cross sectional area than the turbine-side oil feeding hole.

According to the embodiments described above in (2), the compressor-side oil feeding hole is configured to have a larger cross sectional area than the turbine-side oil feeding hole. Thus, the oil feeding pressure for the oil at the output of the compressor-side oil feeding passage is increased to enable an increase in the amount of oil fed to the compressor-side floating bearing. This enables a reduction in the likelihood that the compressor-side floating bearing will be seized.

(3) In certain embodiments, in the turbocharger described above in (1) or (2), the bearing housing includes an oil introduction path that is open in an outer surface of the bearing housing at a first end of the oil introduction path and that extends toward the rotating shaft on a second end side of the oil introduction path, to communicate with the compressor-side oil feeding passage and the turbine-side oil feeding passage. The oil introduction path is disposed at a position that is closer to the compressor-side floating bearing than to the turbine-side floating bearing in the axial direction of the rotating shaft. Moreover, the compressor-side oil feeding hole has a shorter flow path length than the turbine-side oil feeding hole.

According to the embodiments described above in (3), the oil introduction path is disposed at the position closer to the compressor-side floating bearing side than to the turbine-side floating bearing in the axial direction of the rotating shaft. Thus, the distance between the oil introduction path and the compressor-side floating bearing can be made shorter than the distance between the oil introduction path and the turbine-side floating bearing. Therefore, the flow path length of the compressor-side oil feeding hole can be made shorter than the flow path length of the turbine-side oil feeding hole, enabling a reduction in a loss of the pressure for the oil flowing through the compressor-side oil feeding hole. This enables an increase in the feed amount of oil fed to the compressor-side floating bearing through the outlet of the compressor-side oil feeding passage, allowing for a reduction in the likelihood that the compressor-side floating bearing will be seized.

(4) In certain embodiments, in the turbocharger described above in any one of (1) to (3), the compressor-side oil feeding passage includes a compressor-side oil feeding hole extending toward the compressor-side floating bearing, and a compressor-side oil feeding groove formed at an outlet-side end of the compressor-side oil feeding hole so as to extend along an outer periphery of the compressor-side floating bearing and to be open toward the outer periphery of the compressor-side floating bearing.

According to the embodiments described above in (4), the compressor-side oil feeding groove is formed at the outlet-side end of the compressor-side oil feeding hole, the compressor-side oil feeding groove extending along the outer periphery of the compressor-side floating bearing and being open toward the outer periphery of the compressor-side floating bearing. Thus, the compressor-side oil feeding groove enables an increase in a pressure receiving area for the oil feeding pressure the oil fed to the compressor-side floating bearing. Therefore, the feed amount of oil fed to the compressor-side floating bearing can be increased, enabling a reduction in seizure of the compressor-side floating bearing.

Furthermore, a turbocharger can be provided that enables a reduction in the seizure of the compressor-side floating bearing simply by machining the bearing housing so as to further add a compressor-side oil feeding groove thereto even when the compressor-side oil feeding hole and the turbine-side oil feeding hole have the same cross sectional area.

(5) In certain embodiments, in the turbocharger described above in (4), the turbine-side oil feeding passage includes a turbine-side oil feeding hole extending toward the turbine-side floating bearing, and a turbine-side oil feeding groove formed at an outlet-side end of the turbine-side oil feeding hole so as to extend along an outer periphery of the turbine-side floating bearing and to be open toward the outer periphery of the turbine-side floating bearing. The compressor-side oil feeding groove has a larger opening area than the turbine-side oil feeding groove.

According to the embodiments described above in (5), the turbine-side oil feeding passage includes the turbine-side oil feeding hole extending toward the turbine-side floating bearing and the turbine-side oil feeding groove formed at the outlet-side end of the turbine-side oil feeding hole so as to extend along the outer periphery of the turbine-side floating bearing and to be open toward the outer periphery of the turbine-side floating bearing. Thus, the amount of oil fed toward the compressor-side floating bearing can be increased simply by machining the bearing housing so as to further add a turbine-side oil feeding groove thereto. This allows the rotating shaft rotating at high speed to be effectively cooled.

Furthermore, compared to a case where the compressor-side oil feeding groove has the same opening area as that of the turbine-side oil feeding groove, the embodiments in which the compressor-side oil feeding groove has a larger opening area than the turbine-side oil feeding groove enable an increase in the amount of oil fed to the compressor-side floating bearing, allowing for a reduction in the seizure of the compressor-side floating bearing.

(6) In certain embodiments, the turbocharger described above in any one of (1) to (5) further includes a sleeve arranged over the rotating shaft between the compressor-side floating bearing and the turbine-side floating bearing, the sleeve having a first axial end that contacts a second axial end of the compressor-side floating bearing and having a second axial end that contacts a first axial end of the turbine-side floating bearing. A discharge port, through which oil is discharged, is formed in an axially central portion of the sleeve, the oil being fed to the compressor-side floating bearing and the turbine-side floating bearing and having flowed in between the rotating shaft and the sleeve. Moreover, the sleeve has a larger inner diameter at an opening end thereof on the compressor-side floating bearing side than at an opening end thereof on the turbine-side floating bearing side.

According to the embodiments described above in (6), the sleeve is further provided between the compressor-side floating bearing and the turbine-side floating bearing, allowing these bearings to be positioned in a direction along the axial direction of the rotating shaft in which the bearings approach each other.

Furthermore, since the opening end of the sleeve on compressor-side floating bearing side has a larger inner diameter than the opening end of the sleeve on the turbine-side floating bearing, the oil flowing out from the sleeve side of the compressor-side floating bearing can be allowed to smoothly flow to the discharge port formed in the axially central portion of the sleeve. This allows prevention of a possible increase in the loss of the pressure for the oil flowing from the compressor-side floating bearing to the sleeve side. Therefore, the oil fed to the compressor-side floating bearing and moving to the sleeve side can be allowed to flow smoothly. Consequently, the feed amount of oil fed to the compressor-side floating bearing can be increased to enable a reduction in the likelihood that the compressor-side floating bearing will be seized.

(7) In certain embodiments, in the turbocharger described above in (6), the sleeve has a larger inner diameter at the axially central portion thereof than at opening ends thereof on both axial sides.

According to the embodiments described above in (7), the sleeve has a larger inner diameter at the axially central portion thereof than at the opening ends thereof on both axial sides, enabling an increase in the volume of the space portion inside the axially central portion of the sleeve. For the space portion, the oil flows out from the compressor-side floating bearing and the turbine-side floating bearing into the space portion. Thus, the oil may stagnate in the space portion if the axially central portion of the sleeve has an inner diameter that is the same as or smaller than the inner diameter of each of the opening ends of the sleeve on both axial sides. However, when the sleeve has a larger inner diameter at the axially central portion thereof than at the opening ends thereof on both axial sides, the space portion has an increased volume, allowing the oil having flowed in between the rotating shaft and the sleeve to be prevented from stagnating in the space portion. Therefore, this enables prevention of a possible increase in the loss of the pressure for the oil flowing from the compressor-side floating bearing and the turbine-side floating bearing to the sleeve side, allowing smooth flow of the oil fed to the compressor-side floating bearing and moving to the sleeve side. Consequently, the feed amount of oil fed to the compressor-side floating bearing can be increased to enable a reduction in the likelihood that the compressor-side floating bearing will be seized.

(8) In certain embodiments, the turbocharger described above in any one of (1) to (5) further includes a first C-type retaining ring installed on the rotating shaft and contacting an end of the compressor-side floating bearing that is on the turbine-side floating bearing side. A second C-type retaining ring installed on the rotating shaft and contacting an end of the turbine-side floating bearing that is on the compressor-side floating bearing side, and the first C-type retaining ring is installed on the rotating shaft such that a joint portion of the first C-type retaining ring is oriented to face an oil drain outlet of the housing. Moreover, the second C-type retaining ring is installed on the rotating shaft such that a joint portion of the second C-type retaining ring is oriented to face a direction other than the direction toward the oil drain outlet of the housing.

According to the embodiments described above in (8), the first C-type retaining ring and the second C-type retaining ring allow the compressor-side floating bearing and the turbine-side floating bearing to be positioned in the axial direction of the rotating shaft along the direction in which the bearings approach each other.

Furthermore, since the joint portion of the first C-type retaining ring is installed on the rotating shaft so as to be oriented to face the oil drain outlet of the housing, the joint portion is provided in the middle of a path through which oil flowing out from the compressor-side floating bearing may flow to the oil drain outlet if the first C-type retaining ring is not present. This enables prevention of a possible increase in the loss of the pressure for the oil flowing from the compressor-side floating bearing to the first C-type retaining ring side, allowing smooth flow of oil fed to the compressor-side floating bearing and moving to the first C-type retaining ring side. Consequently, the feed amount of oil fed to the compressor-side floating bearing can be increased to enable a reduction in the likelihood that the compressor-side floating bearing will be seized.

Moreover, the second C-type retaining ring is installed on the rotating shaft such that the joint portion of the second C-type retaining ring is oriented to face a direction other than the direction toward the oil drain port of the housing. Thus, the joint portion of the second C-type retaining ring is provided at a position offset from a path through which the oil flowing out from the turbine-side floating bearing may flow to the oil drain outlet if the second C-type retaining ring is not present. This increases the loss of the pressure for the oil flowing from the turbine-side floating bearing toward the second C-type retaining ring, enabling a reduction in the amount of oil flowing to the oil drain outlet. This allows prevention of the likelihood that an excessive amount of oil flows from the turbine-side floating bearing, causing the oil to stagnate in the space portion to hinder the oil discharged from the compressor-side floating bearing from leaving the space portion. Consequently, the oil fed to the compressor-side floating bearing and moving to the first C-type retaining ring side flows smoothly, enabling a reduction in the likelihood that the compressor-side floating bearing will be seized.

(9) In certain embodiments, in the turbocharger described above in (8), the bearing housing includes a compressor-side bearing support portion that supports the compressor-side floating bearing, and a turbine-side bearing support portion that supports the turbine-side floating bearing. A discharge space is formed inside the bearing housing between the compressor-side bearing support portion and the turbine-side bearing support portion, the discharge space allowing oil flowing out from the first C-type retaining ring side of the compressor-side floating bearing and oil flowing out from the second C-type retaining ring side of the turbine-side floating bearing to be discharged to the drain oil outlet of the housing. Moreover, a cutout surface portion, which extends toward the discharge space side from an inner peripheral surface to an outer peripheral surface of the compressor-side bearing support portion, is formed at a discharge outlet-side end of the compressor-side bearing support portion that is on the discharge space side.

According to the embodiments described above in (9), the cutout surface portion, which extends toward the discharge space side from the inner peripheral surface to the outer peripheral surface of the compressor-side bearing support portion, is formed at the discharge outlet-side end of the compressor-side bearing support portion that is on the discharge space side. Thus, when moving from the discharge space to the discharge outlet side, the oil having flowed out from the first C-type retaining ring side of the compressor-side floating bearing flows along the cutout surface portion extending to the discharge space side. Thus, the oil can be allowed to flow more smoothly. This eliminates the likelihood that the oil stagnates in the discharge space, enabling an increase in the feed amount of oil fed to the compressor-side floating bearing and enabling a further reduction in the likelihood that the compressor-side floating bearing will be seized.

DETAILED DESCRIPTION

Figure 1:
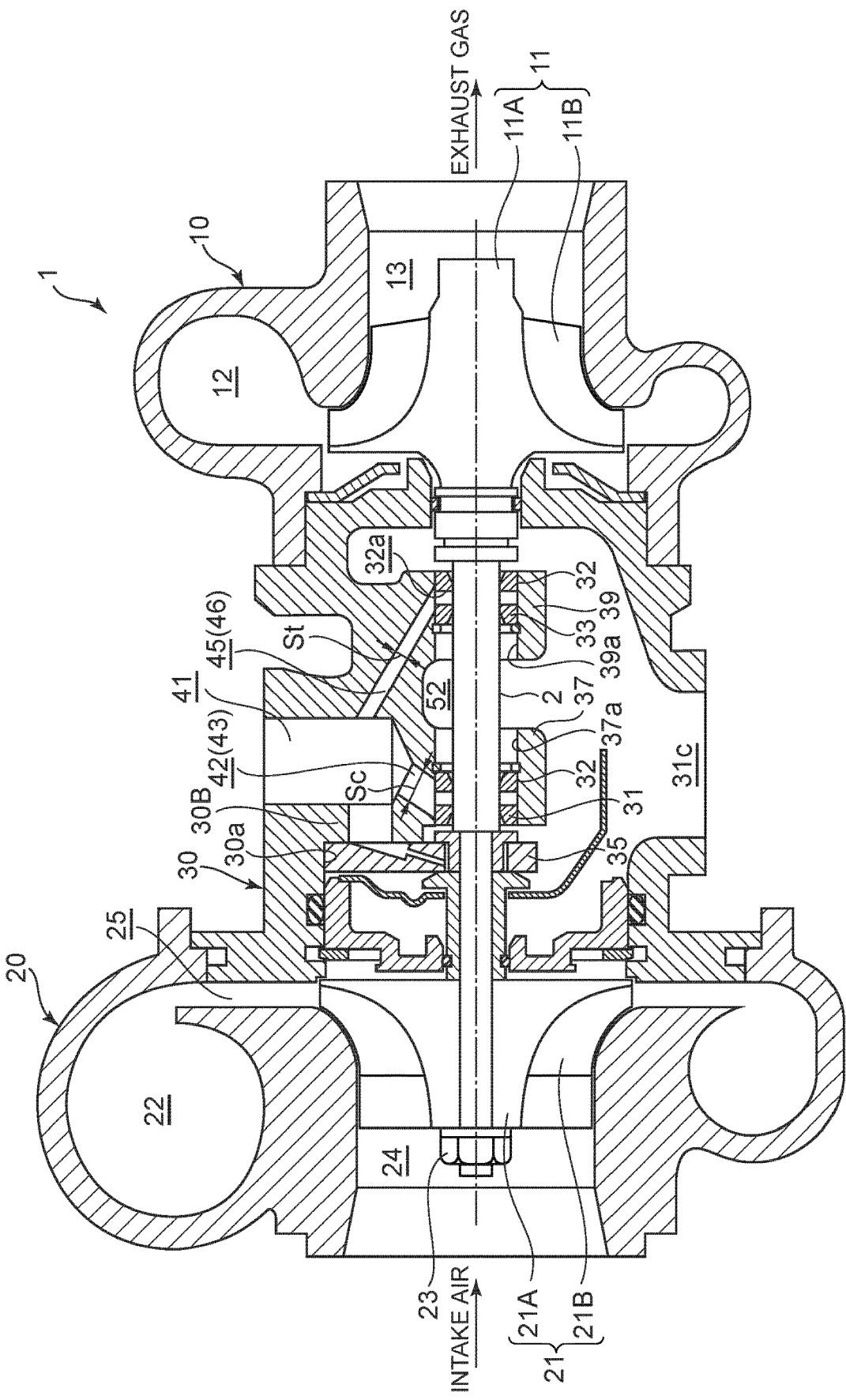
FIG. 1 is a side sectional view depicting a cross section of a turbocharger according to an embodiment of the present invention along an axial direction of a rotating shaft of the turbocharger.

Certain embodiments of the present invention will be described below with reference to the attached drawings. However, dimensions, materials, shapes, relative arrangements, and the like of components described in the embodiments or depicted in the drawings are not intended to be limitative of the scope of the present invention but are illustrative only.

For example, not only do expressions of relative or absolute arrangements such as "in a direction", "along a direction", "parallel", "orthogonal", "central", "concentric", or "coaxial" precisely describe such arrangements, but also describe a state involving relative displacement with a tolerance, or an angle or a distance at which the same functions can still be accomplished.

For example, not only do expressions which describe a state where things are equal to each other, such as "the same", "equal" and "homogeneous", describe a precisely equal state, but also describe a state involving a tolerance or a difference with which the same functions can still be accomplished.

For example, not only do expressions for shapes such as rectangular and cylindrical describe a rectangular shape and a cylindrical shape in a geometrically precise way, but also describe shapes including a recessed and protruding portion and a chamfered portion to the extent that the same effects can still be accomplished.

On the other hand, an expression "comprising", "containing", "provided with", "including, or "having" one component is not an exclusive expression that excludes the other components.

Furthermore, in the description below, detailed description of the same components may be omitted, with these components denoted by the same reference numerals.

FIG. 1 is a side sectional view of a turbocharger according to an embodiment of the present invention, depicting a cross section of the turbocharger along an axial direction of a rotating shaft thereof.

The turbocharger according to an embodiment of the present invention is, for example, though not limited to, a turbocharger mounted in an automotive engine.

As depicted in FIG. 1, a turbocharger 1 in the present embodiment includes three housings including a turbine housing 10 that houses a turbine impeller 11 provided on a first end side of a rotating shaft 2, a compressor housing 20 that houses a compressor impeller 21 provided on a second end of the rotating shaft 2, and a bearing housing 30 that houses a compressor-side floating bearing 31 and a turbine-side floating bearing 33 rotatably supporting the rotating shaft 2 and that also houses a thrust plate 35 supporting a thrust force (axial force) of the rotating shaft 2.

A vortical turbine scroll flow path 12 is formed on an outer peripheral portion of the turbine housing 10. A turbine impeller 11 is arranged in a central portion of the turbine scroll flow path 12. The turbine impeller 11 includes a turbine hub 11A shaped like a truncated cone by cutting a head of a cone on a plane parallel to a bottom surface of the cone and a plurality of turbine blades 11B protruding from a peripheral surface of the turbine hub 11A. The turbine hub 11A of the turbine impeller 11 is joined to a first end of the rotating shaft 2, for example, by welding. Exhaust gas having acted on the turbine impeller 11 by flowing through the turbine scroll flow path 12 is discharged through an exhaust gas discharge flow path 13 extending along the axial direction of the rotating shaft 2, to the outside of the turbine housing 10.

A vortical compressor scroll flow path 22 is formed on an outer peripheral portion of the compressor housing 20. The compressor impeller 21 is arranged in a central portion of the compressor scroll flow path 22. The compressor impeller 21 includes a compressor hub 21A shaped by cutting a head of a cone on a plane parallel to a bottom surface of the cone and a plurality of compressor blades 21B protruding from a peripheral surface of the compressor hub 21A in a radial direction. A fitting insertion hole (not depicted in the drawings) is formed in a central portion of the compressor hub 21A of the compressor impeller 21 such that the second end side of the rotating shaft 2 is fitted and inserted into the fitting insertion hole. After the first end side of the rotating shaft 2 is fitted and inserted into the fitting and insertion, the compressor impeller 21 is fixed to the second end side of the rotating shaft 2 by tightening a nut 23 from a tip of the compressor hub 21A. After flowing through an intake air introduction flow path 24 extending along the axial direction of the rotating shaft 2 and then being compressed by the compressor impeller 21, intake air is introduced into the compressor scroll flow path 22 via a diffuser flow path 25 extending along a direction orthogonal to the axial direction of the rotating shaft 2, and is then fed to an engine not depicted in the drawings.

A bearing housing 30 is arranged between the turbine housing 10 and the compressor housing 20 and has a first-side end coupled to the compressor housing 20 and a second-side end coupled to the turbine housing 10. The above-described diffuser flow path 25 is defined between the bearing housing 30 and the compressor housing 20.

Furthermore, the bearing housing 30 is internally provided with a protruding wall portion 30B protruding from an inner peripheral wall surface 30a of the bearing housing 30. A compressor-side bearing support portion 37 and a turbine-side bearing support portion 39 are formed on a tip side of the protruding wall portion 30B to house the above-described compressor-side floating bearing 31 and turbine-side floating bearing 33, respectively.

The compressor-side bearing support portion 37 and the turbine-side bearing support portion 39 are provided at a distance from each other in the axial direction of the rotating shaft 2. The compressor-side bearing support portion 37 is provided with a compressor-side through-hole 37a penetrating the compressor-side bearing support portion 37 in the axial direction of the rotating shaft 2. A central axis of the compressor-side through-hole 37a is formed coaxially with a central axis of the rotating shaft 2. The compressor-side floating bearing 31 is inserted into the compressor-side through-hole 37a. In the illustrated embodiment, the compressor-side floating bearing 31 is arranged such that a compressor-side end thereof is flush with a compressor-side end of the compressor-side through-hole 37a. The compressor-side through-hole 37a that is located on the turbine-side bearing support portion 39 side with respect to a turbine-side end of the compressor-side floating bearing 31 forms a discharge flow path through which oil discharged from the compressor-side floating bearing 31 flows.

The turbine-side bearing support portion 39 is formed similarly to the compressor-side bearing support portion 37, and provided with a turbine-side through-hole 39a penetrating the turbine-side bearing support portion 39 in the axial direction of the rotating shaft 2. A central axis of the turbine-side through-hole 39a is formed coaxially with the central axis of the rotating shaft 2. The turbine-side floating bearing 33 is installed in the turbine-side through-hole 39a. In the illustrated embodiment, the turbine-side floating bearing 33 is arranged such that a turbine-side end thereof is flush with a turbine-side end of the turbine-side through-hole 39a. The turbine-side through-hole 39a that is more of the compressor-side bearing support portion 37 than a compressor-side end of the turbine-side floating bearing 33 forms a discharge flow path through which oil discharged from the turbine-side floating bearing 33 flows.

The compressor-side floating bearing 31 and the turbine-side floating bearing 33 have the same shape, and thus, the compressor-side floating bearing 31 will be described, and description of the turbine-side floating bearing 33 is omitted, with similar phase portions denoted by the same reference numerals.

Figure 2:
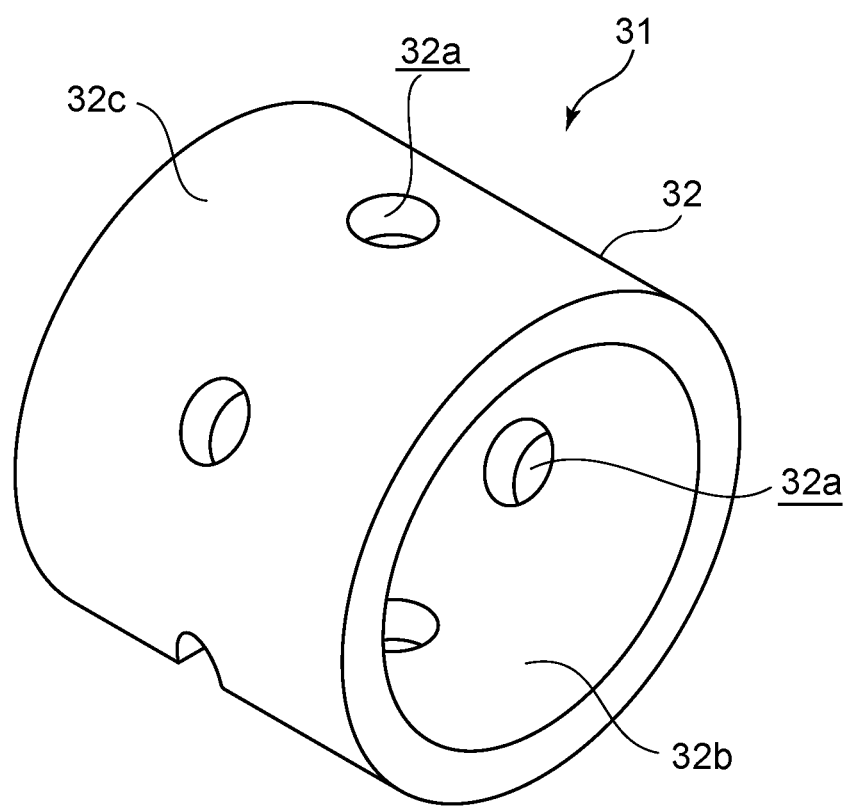
FIG. 2 is a perspective view of a floating bearing according to an embodiment of the present invention.

FIG. 2 is a perspective view of the floating bearing according to an embodiment of the present invention.

As depicted in FIG. 2, the compressor-side floating bearing 31 includes a peripheral wall portion 32 shaped like a cylinder so as to have a predetermined thickness. The peripheral wall portion 32 is provided with a plurality of oil feeding holes 32a penetrating the peripheral wall portion 32 toward a central axis of the peripheral wall portion 32. A plurality of the oil feeding holes 32a is formed in an axially middle portion of the peripheral wall portion 32 and at intervals in a circumferential direction of the peripheral wall portion 32. In the illustrated embodiment, a case where six oil feeding holes 32a are formed is depicted. However, the number of the oil feeding holes 32a is not limited to this.

With the compressor-side floating bearing 31 inserted into the compressor-side through-hole 37a and with the rotating shaft 2 inserted into an inner peripheral surface 32b of the peripheral wall portion 32 as depicted in FIG. 1 and FIG. 2, a clearance that is filled with oil and that is not depicted in the drawings is formed between an outer peripheral surface of the rotating shaft 2 and the inner peripheral surface 32b of the peripheral wall portion 32 and between an outer peripheral surface 32c of the peripheral wall portion 32 and an inner surface of the compressor-side through-hole 37a. Thus, the compressor-side floating bearing 31 floats over the compressor-side bearing support portion 37 and the rotating shaft 2 via oil.

On the other hand, as is the case with the compressor-side floating bearing 31, with the turbine-side floating bearing 33 inserted into the turbine-side through-hole 39a and with the rotating shaft 2 inserted into an inner peripheral surface 32b of the peripheral wall portion 32, a clearance that is filled with oil and that is not depicted in the drawings is formed between the outer peripheral surface of the rotating shaft 2 and the inner peripheral surface 32b of the peripheral wall portion 32 and between the outer peripheral surface 32c of the peripheral wall portion 32 and an inner surface of the turbine-side through-hole 39a. Thus, the turbine-side floating bearing 33 floats over the turbine-side bearing support portion 39 and the rotating shaft 2 via oil.

Figure 3:
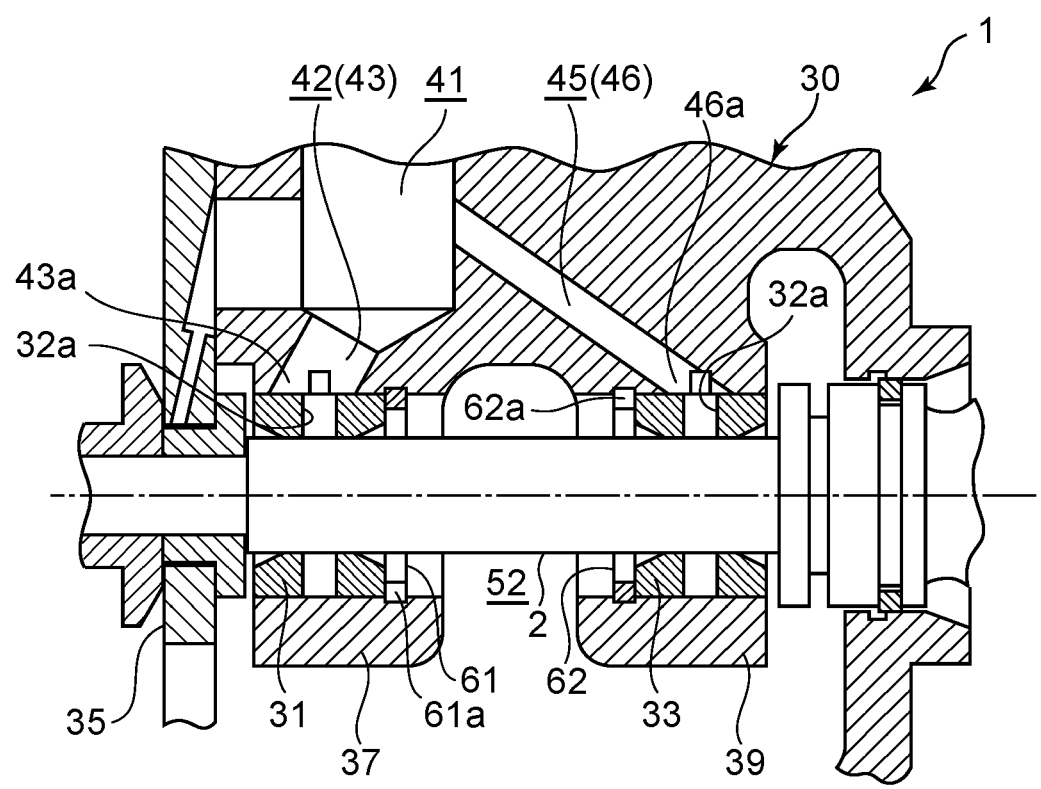
FIG. 3 is a main-part cross-sectional view depicting an oil feeding passage through which oil is fed to floating bearings that support the rotating shaft of the turbocharger according to an embodiment of the present invention.
Figure 4A:
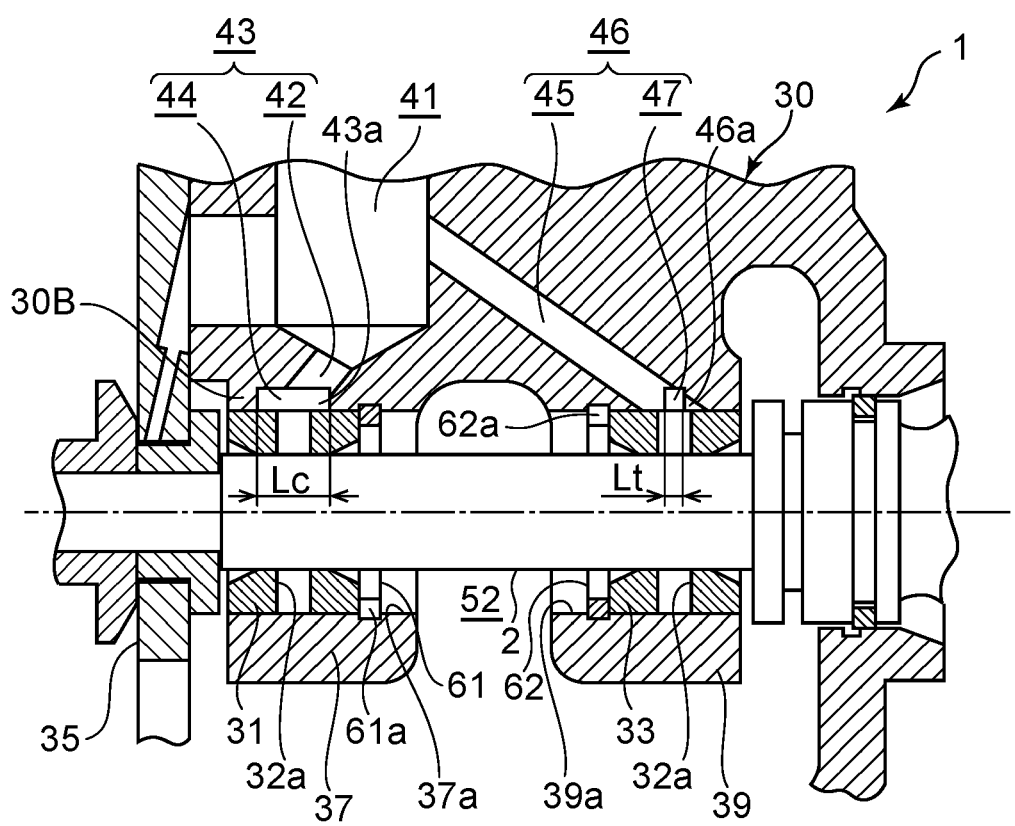
FIG. 4A is a main-part cross-sectional view depicting an oil feeding passage through which oil is fed to the floating bearings that support the rotating shaft of the turbocharger according to an embodiment of the present invention.
Figure 5:
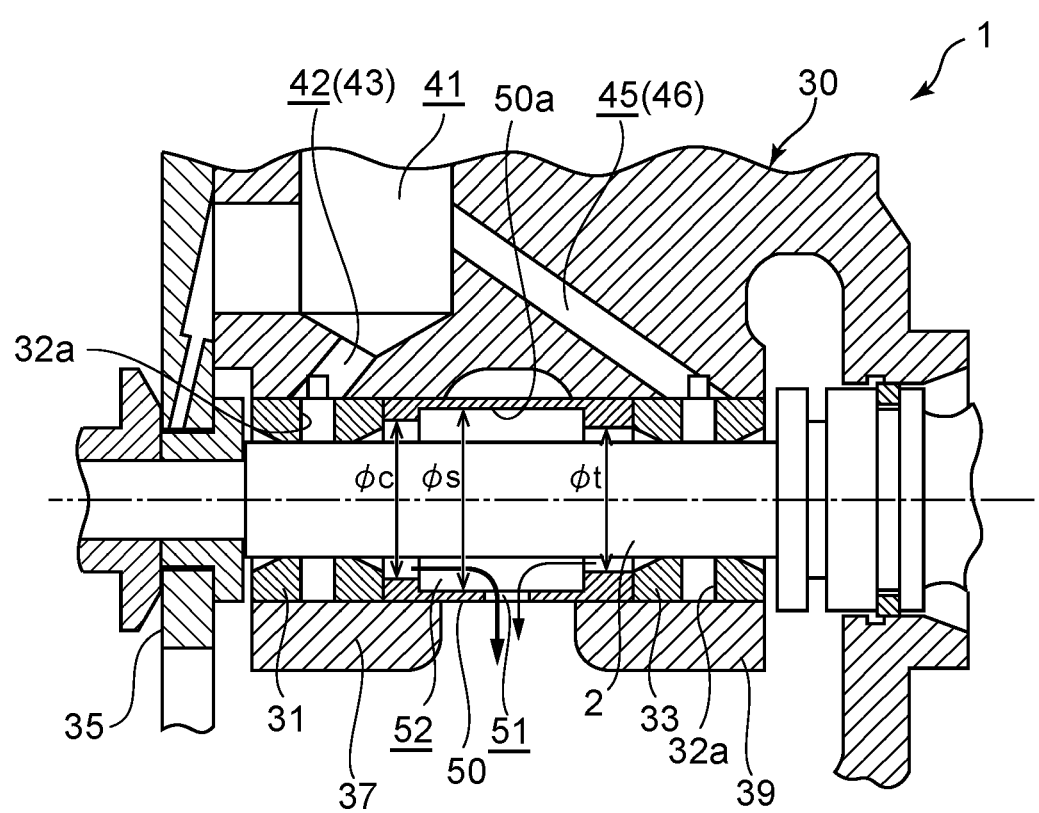
FIG. 5 is a main-part cross-sectional view illustrating that a sleeve is arranged between two floating bearings that support the rotating shaft of the turbocharger according to an embodiment of the present invention.
Figure 6A:
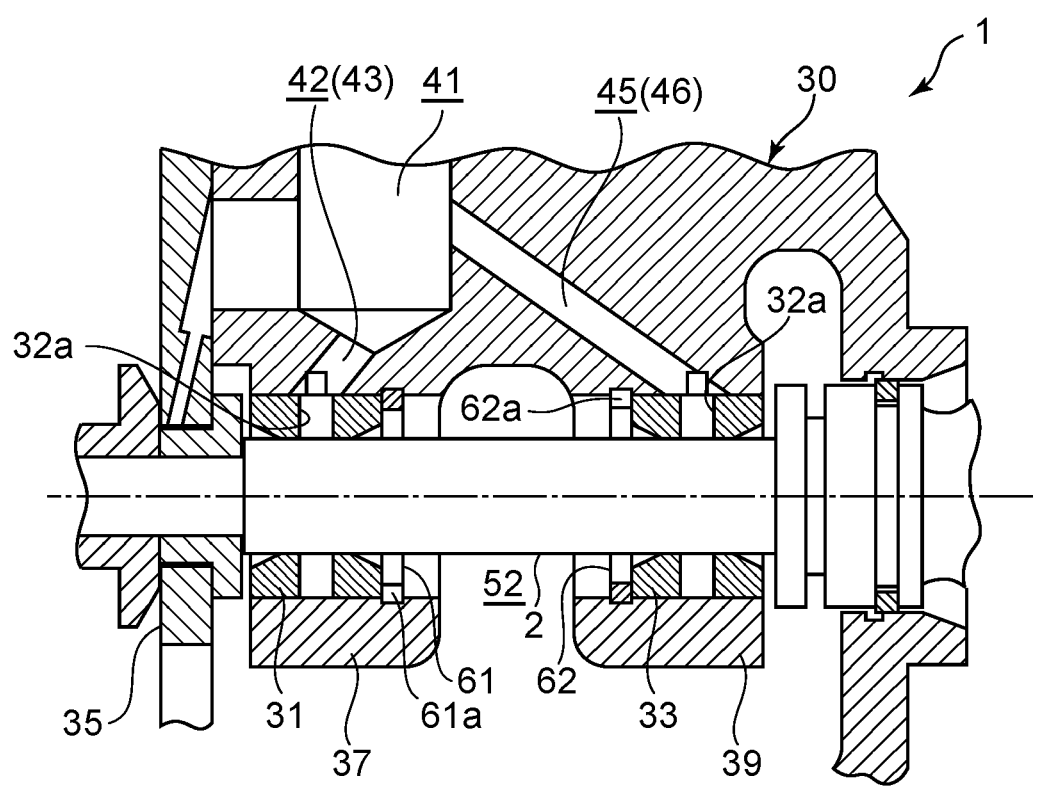
FIG. 6A is a main-part cross-sectional view illustrating that C-type retaining rings that position two floating bearings supporting the rotating shaft are installed on the rotating shaft of the turbocharger according to an embodiment of the present invention.
Figure 7:
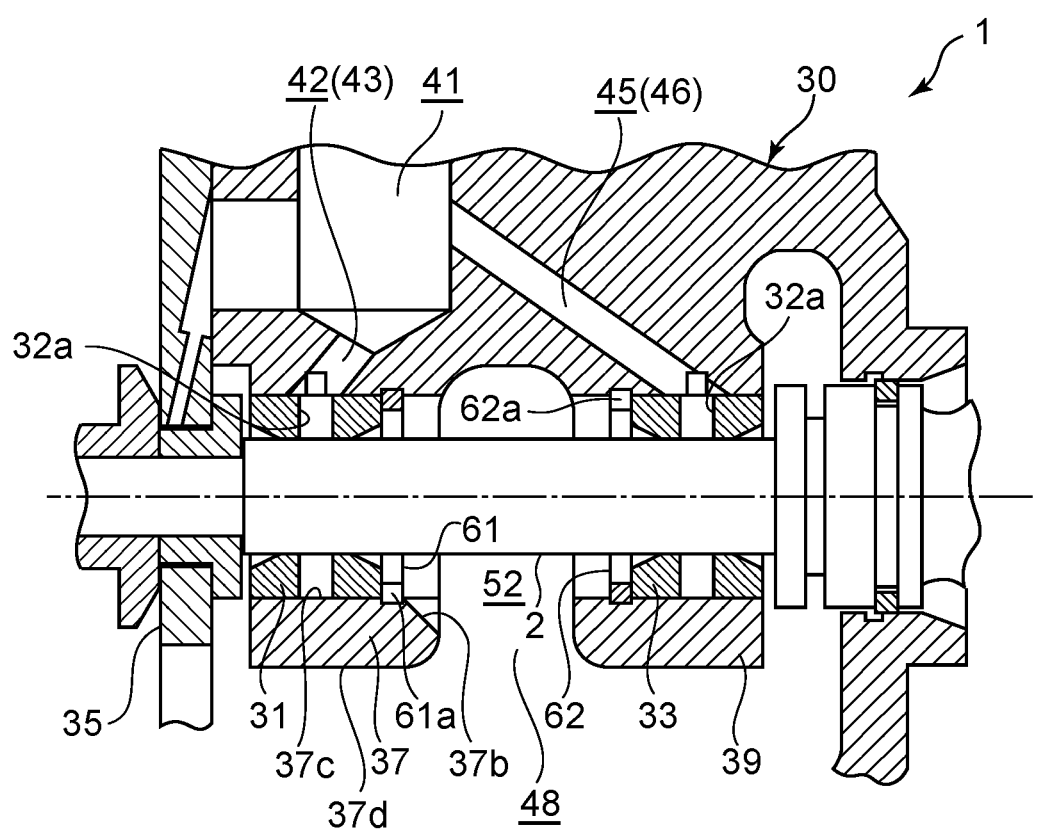
FIG. 7 is a main-part cross-sectional view illustrating that a cutout surface portion is formed on a bearing support portion that supports the compressor-side floating bearing of the turbocharger according to an embodiment of the present invention.

FIG. 3 is a main-part cross-sectional view depicting the oil feeding passages through which oil is fed to the floating bearings supporting the rotating shaft of the turbocharger according to an embodiment of the present invention. FIG. 4A is a main-part cross-sectional view of depicting the oil feeding passages through which oil is fed to the floating bearings supporting the rotating shaft of the turbocharger according to an embodiment of the present invention. FIG. 5 is a main-part cross-sectional view illustrating that a sleeve is arranged between the two floating bearings supporting the rotating shaft of the turbocharger according to the embodiment of the present invention. FIG. 6A is a main-part cross-sectional view illustrating that C-type retaining rings that position the two floating bearings supporting the rotating shaft are installed on the rotating shaft of the turbocharger according to an embodiment of the present invention. FIG. 7 is a main-part cross-sectional view illustrating that a cutout surface portion is formed on the bearing support portion supporting the compressor-side floating bearing of the turbocharger according to an embodiment of the present invention.

In the turbocharger 1 according to at least one embodiment of the present invention, the protruding wall portion 30B is provided with an oil introduction path 41 through which oil (lubricant) fed to the above-described compressor-side floating bearing 31 and turbine-side floating bearing 33 and the thrust plate 35 is introduced as depicted in FIG. 3, FIG. 4A, FIG. 4B, FIG. 5, FIG. 6A, and FIG. 7. In the illustrated embodiment, the oil introduction path 41 has a first end that is open in an upper end of the bearing housing 30 and a second end that extends through the bearing housing 30 toward the rotating shaft such that a tip portion of the oil introduction path 41 extends to a position that is closer to the compressor-side floating bearing 31 side than to the turbine-side floating bearing 33. Thus, the oil introduction path 41 is disposed at a position that is closer to the compressor-side floating bearing 31 side in the axial direction of the rotating shaft 2.

A compressor-side oil feeding hole 42 is formed at the tip portion of the oil introduction path 41 in the protruding wall portion 30B so as to extend toward the compressor-side floating bearing 31. The compressor-side oil feeding hole 42 communicates with the oil introduction path 41 and lies opposite to an outer peripheral surface of the compressor-side floating bearing 31 to communicate with the compressor-side through-hole 37a. Consequently, the compressor-side oil feeding hole 42 forms a compressor-side oil feeding passage 43 that enables oil to be fed to the compressor-side floating bearing 31 side. A cross section of the compressor-side oil feeding hole 42 is shaped like a circle that allows the compressor-side oil feeding hole 42 to be easily machined.

A turbine-side oil feeding hole 45 that extends toward the turbine-side floating bearing 33 is formed at the tip portion of the oil introduction path 41 in the protruding wall portion 30B that is on the turbine-side bearing support portion 39 side. The turbine-side oil feeding hole 45 communicates with the oil introduction path 41 and lies opposite to the outer peripheral surface 32c of the turbine-side floating bearing 33 to communicate with the turbine-side through-hole 39a. Consequently, the turbine-side oil feeding hole 45 forms a turbine-side oil feeding passage 46 that enables oil to be fed to the turbine-side floating bearing 33 side. A cross section of the turbine-side oil feeding hole 45 is shaped like a circle that allows the turbine-side oil feeding hole 45 to be easily machined.

The compressor-side oil feeding passage 43 is configured such that the ratio of an oil feeding pressure for the oil at an outlet 43a of the compressor-side oil feeding passage 43 to an oil feeding pressure for the oil at an outlet 46a of the turbine-side oil feeding passage 46 is higher than 1.0 and lower than 1.5. Preferably, the oil feeding pressure Pc for the oil at the outlet 43a of the compressor-side oil feeding passage 43 is configured to be more than 1.0 and less than 1.1 times as high as the oil feeding pressure Pt for the oil at the outlet 46a of the turbine-side oil feeding passage 46.

According to such an embodiment, even if the oil flowing through the compressor-side oil feeding passage 43 is more viscous than the oil flowing through the turbine-side oil feeding passage 46, the feed amount of oil flowing through the compressor-side oil feeding passage 43 can be increased. Therefore, the amount of oil flowing toward the compressor-side floating bearing 31 side increases to enable a reduction in the likelihood that the compressor-side floating bearing 31 will be seized.

In certain embodiments, the compressor-side oil feeding passage 43, as depicted in FIG. 3, at least includes the compressor-side oil feeding hole 42 extending toward the compressor-side floating bearing 31, and the turbine-side oil feeding passage 46 at least includes the turbine-side oil feeding hole 45 extending toward the turbine-side floating bearing 33. The compressor-side oil feeding hole 42 is formed to have a cross-sectional area Sc that is larger than a cross-sectional area St of the turbine-side oil feeding hole 45.

According to such an embodiment, when the compressor-side oil feeding hole 42 and the turbine-side oil feeding hole 45 have the same cross-sectional area, the oil flowing through the compressor-side oil feeding hole 42 the temperature in which is reduced by transfer of heat by exhaust gas becomes more viscous, leading to an increased pressure loss. Therefore, a reduced amount of oil is fed to the compressor-side floating bearing 31, possibly resulting in the likelihood that the compressor-side floating bearing 31 will be seized. Thus, the compressor-side oil feeding hole 42 and the turbine-side oil feeding hole 45 are formed such that the cross-sectional area Sc of the compressor-side oil feeding hole 42 is larger than the cross-sectional area St of the turbine-side oil feeding hole 45. Consequently, even if the oil flowing through the compressor-side oil feeding passage 43 is more viscous than the oil flowing through the turbine-side oil feeding passage 46, the oil feeding pressure for the oil at the outlet 43a of the compressor-side oil feeding passage 43 increases to enable an increase in the feed amount of oil fed to the compressor-side floating bearing 31. Consequently, the likelihood that the compressor-side floating bearing 31 will be seized can be reduced.

In certain embodiments, the flow path length of the compressor-side oil feeding hole 42 is configured to be shorter than the flow path length of the turbine-side oil feeding hole 45, as depicted in FIG. 3, FIG. 4A, FIG. 5, FIG. 6A, and FIG. 7.

According to such an embodiment, the flow path length of the compressor-side oil feeding hole 42 is shorter than the flow path length of the turbine-side oil feeding hole 45, thus enabling a reduction in the loss of the pressure for the oil flowing through the compressor-side oil feeding hole 42. This enables an increase in the feed amount of oil fed to the compressor-side floating bearing 31 through the outlet 43a of the compressor-side oil feeding passage 43, allowing for a reduction in the likelihood that the compressor-side floating bearing 31 will be seized.

In the embodiment depicted in FIG. 4A, FIG. 5, FIG. 6A, and FIG. 7, a case where the compressor-side oil feeding hole 42 has the same cross-sectional area as that of the turbine-side oil feeding hole 45 is illustrated. However, an embodiment of the invention includes a configuration in which the ratio of the oil feeding pressure for the oil at the outlet 43a of the compressor-side oil feeding passage 43 to the oil feeding pressure for the oil at the outlet 46a of the turbine-side oil feeding passage 46 is higher than 1.0 and lower than 1.5 when the compressor-side oil feeding hole 42 has a smaller cross-sectional area than the turbine-side oil feeding hole 45 and the compressor-side oil feeding hole 42 has a shorter flow path length than the turbine-side oil feeding hole 45.

Figure 4B:
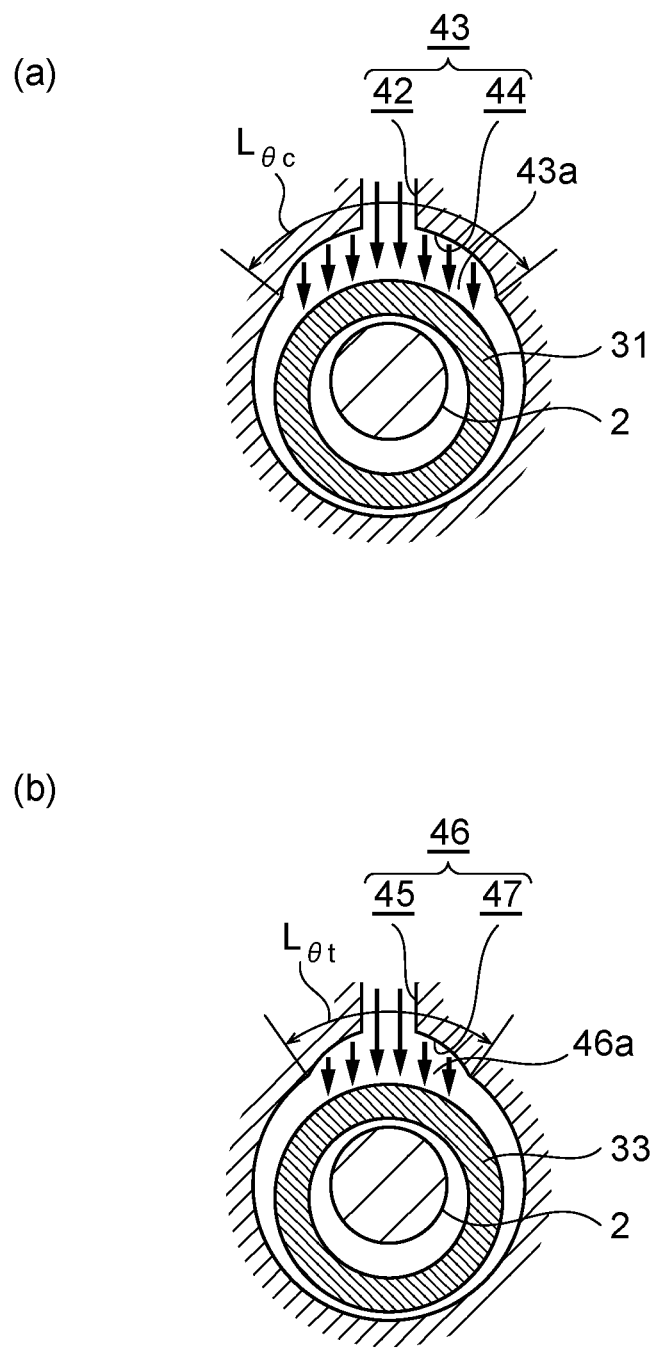
FIG. 4B is a diagram depicting a cross section of the floating bearings in the turbocharger depicted in FIG. 4A, FIG. 4B(a) is a cross-sectional view of a compressor-side floating bearing as seen in a direction orthogonal to the rotating shaft, and FIG. 4B(b) is a cross-sectional view of a turbine-side floating bearing as seen in the direction orthogonal to the rotating shaft.

FIG. 4B is a diagram depicting a cross section of the compressor-side floating bearing 31 and the turbine-side floating bearing 33 in the turbocharger 1 depicted in FIG. 4A. FIG. 4B(a) is a cross-sectional view of the compressor-side floating bearing 31 as seen in a direction orthogonal to the rotating shaft 2. FIG. 4B(b) is a cross-sectional view of the turbine-side floating bearing 33 as seen in a direction orthogonal to the rotating shaft 2.

In certain embodiments, as depicted in FIG. 4A, FIG. 4B(a), and FIG. 4B(b), the compressor-side oil feeding passage 43 includes the compressor-side oil feeding hole 42 extending toward the compressor-side floating bearing 31 and a compressor-side oil feeding groove 44 formed at an outlet-side end of the compressor-side oil feeding hole 42 so as to extend along an outer periphery of the compressor-side floating bearing 31 and to be open toward the outer periphery of the compressor-side floating bearing 31.

Furthermore, the turbine-side oil feeding passage 46 includes the turbine-side oil feeding hole 45 extending toward the turbine-side floating bearing 33 and a turbine-side oil feeding groove 47 formed at an outlet-side end of the turbine-side oil feeding hole 45 so as to extend along an outer periphery of the turbine-side floating bearing 33 and to be open toward the outer periphery of the turbine-side floating bearing 33. The compressor-side oil feeding groove 44 has a larger opening area than the turbine-side oil feeding groove 47. The opening area of the compressor-side oil feeding groove 44 is a value calculated by multiplying a rotating shaft-wise length Lc of the compressor-side oil feeding groove 44 by a circumferential length L$\theta$c of the compressor-side floating bearing 31 along the outer periphery thereof. On the other hand, the opening area of the turbine-side oil feeding groove 47 is a value calculated by multiplying a rotating shaft-wise length Lt of the turbine-side oil feeding groove 47 by a circumferential length Lθt of the turbine-side floating bearing 33 along the outer periphery thereof.

In the illustrated embodiment, the rotating shaft-wise length Lc of the compressor-side oil feeding groove 44 is larger than the rotating shaft-wise length Lt of the turbine-side oil feeding groove 47. The circumferential length Lθc of the compressor-side floating bearing 31 along the outer periphery thereof is larger than the circumferential length Lθt of the turbine-side floating bearing 33 along the outer periphery thereof.

According to such an embodiment, when the compressor-side oil feeding groove 44 that is open toward the outer periphery of the compressor-side floating bearing 31 is formed at the outlet-side end of the compressor-side oil feeding hole 42, a pressure receiving area for the oil feeding pressure for the oil fed to the compressor-side floating bearing 31 can be increased at the outlet 43a of the compressor-side oil feeding passage 43. Therefore, the feed amount of oil fed to the compressor-side floating bearing 31 can be increased, while the seizure of the compressor-side floating bearing 31 can be reduced. Furthermore, compared to a configuration in which the compressor-side oil feeding groove 44 has the same opening area as that of the turbine-side oil feeding groove 47, the present embodiment in which the compressor-side oil feeding groove 44 has a larger opening area than the turbine-side oil feeding groove 47 enables an increase in the feed amount of oil fed to the compressor-side floating bearing 31, allowing for a reduction in the seizure of the compressor-side floating bearing 31.

In the illustrated embodiment, the outlet-side ends of the compressor-side oil feeding hole 42 and the turbine-side oil feeding hole 45 are provided with the corresponding compressor-side oil feeding groove 44 and turbine-side oil feeding groove 47, respectively. However, the compressor-side oil feeding groove 44 may be formed exclusively at the outlet-side end of the compressor-side oil feeding hole 42.

Furthermore, the embodiment depicted in FIG. 4A illustrates the case where the compressor-side oil feeding hole 42 and the turbine-side oil feeding hole 45 have the same cross-sectional area. However, an embodiment of the invention also includes a configuration in which the ratio of the oil feeding pressure for the oil at the outlet 43a of the compressor-side oil feeding passage 43 to the oil feeding pressure for the oil at the outlet 46a of the turbine-side oil feeding passage 46 is higher than 1.0 and lower than 1.5 when the compressor-side oil feeding hole 42 has a smaller cross-sectional area than the turbine-side oil feeding hole 45 and the compressor-side oil feeding groove 44 has a larger opening area than the turbine-side oil feeding groove 47.

FIG. 5 is a main-part cross-sectional view illustrating that a sleeve 50 is arranged between the two compressor-side floating bearings 31 and the turbine-side floating bearing 33, which support the rotating shaft 2 of the turbocharger 1 according to an embodiment of the present invention.

In the illustrated embodiment, as depicted in FIG. 5, the sleeve 50 is further provided over the rotating shaft 2 between the compressor-side floating bearing 31 and the turbine-side floating bearing 33, the sleeve 50 having a first axial end that contacts a second axial end of the compressor-side floating bearing 31 and having a second axial end that contacts a first axial end of the turbine-side floating bearing 33. The sleeve 50 is shaped like a cylinder in which a through-hole 50a is formed through which the rotating shaft 2 can be inserted. A discharge port 51, through which oil is discharged, is formed in an axially central portion of the sleeve 50, the oil being fed to the compressor-side floating bearing 31 and the turbine-side floating bearing 33 and having flowed in between the rotating shaft 2 and the sleeve 50. An inner diameter 4c of an opening end of the sleeve 50 on the compressor-side floating bearing 31 side is configured to be larger than an inner diameter $\phi t$ of an opening end of the sleeve 50 on the turbine-side floating bearing 33 side. Moreover, an inner diameter $\phi s$ of the axially central portion of the sleeve 50 is configured to be larger than each of the inner diameters $\phi c$, $\phi t$ of the opening ends of the sleeve 50 on both axial sides.

According to such an embodiment, the sleeve 50 is further provided between the compressor-side floating bearing 31 and the turbine-side floating bearing 33, allowing these bearings to be positioned in a direction along the axial direction of the rotating shaft 2 in which the bearings approach each other.

When the inner diameter $\phi c$ of the opening end of the sleeve 50 on the compressor-side floating bearing 31 side is larger than the inner diameter $\phi t$ of the opening end of the sleeve 50 on the turbine-side floating bearing 33 side, the oil flowing out from a sleeve 50 side of the compressor-side floating bearing 31 can be allowed to flow smoothly to the discharge port 51 formed in the axially central portion of the sleeve 50. This enables prevention of a possible increase in the loss of the pressure for the oil flowing from the compressor-side floating bearing 31 to the sleeve 50 side, allowing smooth flow of the oil fed to the compressor-side floating bearing 31 and moving to the sleeve 50 side. Therefore, the feed amount of oil fed to the compressor-side floating bearing 31 can be increased, enabling a reduction in the likelihood that the compressor-side floating bearing 31 will be seized.

Moreover, the inner diameter $\phi s$ of the axially central portion of the sleeve 50 is larger than each of the inner diameters $\phi c$, $\phi t$ of the opening ends of the sleeve 50 on both axial sides, thus enabling an increase in the volume of a space portion 52 inside the axially central portion of the sleeve 50. For the space portion 52, the oil flows out from the compressor-side floating bearing 31 and the turbine-side floating bearing 33 into the space portion 52, and thus, the oil may stagnate in the space portion 52 if the inner diameter $\phi s$ of the axially central portion of the sleeve 50 is the same as or smaller than each of the inner diameters $\phi c$, $\phi t$ of the opening ends of the sleeve 50 on both axial sides. However, when the inner diameter $\phi s$ of the axially central portion of the sleeve 50 is larger than each of the inner diameters $\phi c$, $\phi t$ of the opening ends of the sleeve 50 on both axial sides, the likelihood that the oil having flowed in between the rotating shaft 2 and the sleeve 50 stagnates in the space portion 52 can be prevented. Therefore, this enables prevention of a possible increase in the loss of the pressure for the oil flowing from the compressor-side floating bearing 31 and the turbine-side floating bearing 33 to the sleeve side, allowing smooth flow of the oil fed to the compressor-side floating bearing 31 and moving to the sleeve side. Consequently, the likelihood that the compressor-side floating bearing 31 will be seized can be reduced.

Figure 6B:
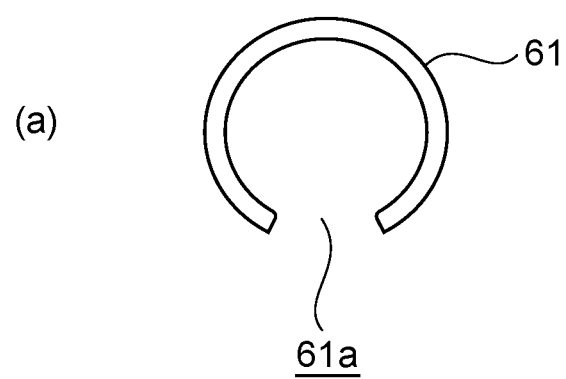
FIG. 6B is a diagram depicting the C-type retaining rings in the turbocharger depicted in FIG. 6A, FIG. 6B(a) is a side view of a first C-type retaining ring that positions the compressor-side floating bearing, and FIG. 6B(b) is a side view of a second C-type retaining ring that positions the turbine-side floating bearing.
Figure 6B:
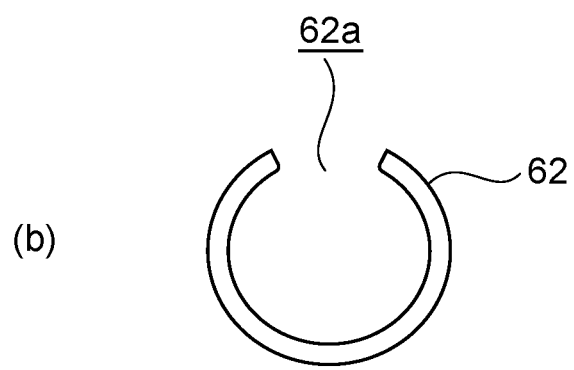

FIG. 6B is a diagram depicting a first C-type retaining ring 61 and a second C-type retaining ring 62 in the turbocharger depicted in FIG. 6A. FIG. 6A(a) is a side view of the first C-type retaining ring 61 that positions the compressor-side floating bearing 31, and FIG. 6A(b) is a side view of the second C-type retaining ring 62 that positions the turbine-side floating bearing 33. FIG. 7 is a main-part cross-sectional view illustrating that a cutout surface portion 37b is formed on the compressor-side bearing support portion 37 that supports the compressor-side floating bearing 31 of the turbocharger 1 according to an embodiment of the present invention.

In certain embodiments, the first C-type retaining ring 61 and the second C-type retaining ring 62 are further installed on the rotating shaft 2 such that the first C-type retaining ring 61 contacts an end of the compressor-side floating bearing 31 on the turbine-side floating bearing 33 side and the second C-type retaining ring 62 contacts an end of the turbine-side floating bearing 33 on the compressor-side floating bearing 31 side, as depicted in FIG. 1, FIG. 3, FIG. 4A, FIG. 6A, FIG. 6B, and FIG. 7. The first C-type retaining ring 61 is installed on the rotating shaft 2 such that a joint portion 61a of the first C-type retaining ring 61 is oriented to face an oil drain outlet 31c see FIG. 1) of the bearing housing 30 (see FIG. 6B(a)). The second C-type retaining ring 62 is installed on the rotating shaft 2 such that a joint portion 62a of the second C-type retaining ring 62 is oriented to face a direction other than the direction toward the oil drain outlet 31c of the bearing, housing 30 (see FIG. 6B(b)). In the illustrated embodiment, the second C-type retaining ring 62 is installed on the rotating shaft such that the joint portion 62a is oriented to face upward.

According to such an embodiment, the first C-type retaining ring 61 and the second C-type retaining ring 62 installed on the rotating shaft 2 allow the compressor-side floating bearing 31 and the turbine-side floating bearing 33 to be positioned in the direction along the axial direction of the rotating shaft 2 in which the compressor-side floating bearing 31 and the turbine-side floating bearing 33 approach each other.

Furthermore, since the joint portion 61a of the first C-type retaining ring 61 is installed on the rotating shaft 2 so as to be oriented to face the oil drain outlet 31c of the bearing housing 30, the joint portion 61a is provided in the middle of a path through which the oil may flow out from the compressor-side floating bearing 31 to the oil drain outlet 31c if the first C-type retaining ring 61 is not present. This enables prevention of a possible increase in the loss of the pressure for the oil flowing from the compressor-side floating bearing 31 to the first C type retaining ring 61 side, allowing smooth flow of the oil fed to the compressor-side floating bearing 31 and moving to the first C-type retaining ring 61 side. Therefore, the feed amount of oil fed to the compressor-side floating bearing 31 can be increased, enabling a reduction in the likelihood that the compressor-side floating bearing 31 will be seized.

Moreover, since the second C-type retaining ring 62 is installed on the rotating shaft 2 such that the joint portion 62a of the second C-type retaining ring 62 is oriented to face the direction other than the direction toward the oil drain outlet 31c of the bearing housing 30, the joint portion 62a of the second C-type retaining ring 62 is provided at a position offset from a path through which the oil may flow out from the turbine-side floating bearing 33 to the oil drain outlet 31c if the second C-type retaining ring 62 is not present. This increases the loss of the pressure for the oil flowing from the turbine-side floating bearing 33 to the second C-type retaining ring 62 side, thus enabling a reduction in the flow rate of the oil flowing to the oil drain outlet 31c. This allows prevention of the likelihood that an excessive amount of oil flows out from the turbine-side floating bearing 33 and stagnates in the space portion 52, hindering the oil discharged from the compressor-side floating bearing 31 from leaving the space portion 52. Therefore, the oil fed to the compressor-side floating bearing 31 and moving to the first C-type retaining ring 61 side is allowed to flow smoothly, enabling a reduction in the likelihood that the compressor-side floating bearing 31 will be seized.

In certain embodiments, as depicted in FIG. 7, a discharge space 48 is formed between the compressor-side bearing support portion 37 and the turbine-side bearing support portion 39, the discharge space allowing the oil flowing out from the first C-type retaining ring 61 side of the compressor-side floating bearing 31 and the oil flowing out from the second C-type retaining ring 62 side of the turbine-side floating bearing 33 to be discharged to the oil drain outlet 31c (see FIG. 1) of the bearing housing 30. The cutout surface portion 37b, which extends toward the discharge space 48 from an inner peripheral surface 37c to an outer peripheral surface 37d of the compressor-side bearing support portion 37, is formed at an oil drain outlet 31c-side end of the compressor-side bearing support portion 37 that is on the discharge space 48 side.

According to such an embodiment, the cutout surface portion 37b is formed at the discharge outlet-side end of the compressor-side bearing support portion 37 that is on the discharge space 48 side. Thus, when the oil having, flowed out from the first C-type retaining ring 61 side of the compressor-side floating bearing 31 moves from the discharge space 48 to the oil drain outlet 31c side, the oil flows along the cutout surface portion 37b extending to the discharge space 48 side and can thus be allowed to flow more smoothly. Therefore, this eliminates the likelihood that the oil stagnates in the discharge space 48, enabling a further reduction in the likelihood that the compressor-side floating, bearing 31 will be seized.

The preferred embodiments have been described. However, the present invention is not limited to the above-described forms. For example, the above-described embodiments may be combined together and may be varied without departing from the objects of the present invention.

For example, in the above-described embodiments, the case where the turbocharger 1 is a supercharger has been described by way of example. However, the turbocharger in the present invention is not limited to this. The turbocharger in the present invention may be, for example, an electric compressor including a rotating shaft rotated by a motor or a mechanical supercharger including a rotating shaft rotated by motive power transmitted through a crankshaft or the like.

REFERENCE SIGNS LIST

1 Turbocharger
3 Rotating shaft
10 Turbine housing
11 Turbine impeller
11A Turbine hub
11B Turbine blade
12 Turbine scroll flow path
13 Discharge flow path
20 Compressor housing
21 Compressor impeller
21A Compressor hub
21B Compressor blade
22 Compressor scroll flow path
23 Nut
24 Intake air introduction flow path
25 Diffuser flow path
30 Bearing housing
30a Inner peripheral wall surface 30B Protruding wall portion
31c Oil drain outlet
31 Compressor-side floating bearing
32 Peripheral wall portion
32a Oil feeding hole
32b Inner peripheral surface
32c Outer peripheral surface
33 Turbine-side floating bearing
35 Thrust plate
37 Compressor bearing support portion
37a Compressor-side through-hole
37b Cutout surface portion
37c Inner peripheral surface
37d Outer peripheral surface
39 Turbine-side bearing support portion
39a Turbine-side through-hole
41 Oil introduction path
42 Compressor-side oil feeding hole
43 Compressor-side oil feeding passage
43a Outlet of compressor-side oil feeding passage
44 Compressor-side oil feeding groove
45 Turbine-side oil feeding hole
46 Turbine-side oil feeding passage
46a Outlet of turbine-side oil feeding passage
47 Turbine-side oil feeding groove
48 Discharge space
50 Sleeve
51 Discharge port
52 Space portion
61 First C-type retaining ring
61A, 62A Joint portion
61 Second C-type retaining ring

The invention claimed is:

1. A turbocharger comprising:
a rotating shaft;
a compressor provided on a first end side of the rotating shaft;
a turbine provided on a second end side of the rotating shaft;
a compressor-side floating bearing that rotatably supports the rotating shaft;
a turbine-side floating bearing that rotatably supports the rotating shaft, the turbine-side floating bearing being arranged at a distance from the compressor-side floating bearing in an axial direction of the rotating shaft and arranged closer to the turbine than the compressor-side floating bearing in the axial direction of the rotating shaft; and
a bearing housing that houses the compressor-side floating bearing and the turbine-side floating bearing, the bearing housing being internally provided with a turbine-side oil feeding passage through which oil to be fed to the turbine-side floating bearing flows and a compressor-side oil feeding passage through which oil to be fed to the compressor-side floating bearing flows,
the turbocharger further comprising a sleeve arranged over the rotating shaft between the compressor-side floating bearing and the turbine-side floating bearing, the sleeve having a first axial end that is configured to contact a second axial end of the compressor-side floating bearing and having a second axial end that is configured to contact a first axial end of the turbine-side floating bearing,
wherein a discharge port, through which oil is discharged, is formed in an axially central portion of the sleeve, the oil being fed to the compressor-side floating bearing and the turbine-side floating bearing and having flowed in between the rotating shaft and the sleeve, and
the sleeve has a larger inner diameter at an opening end thereof on the compressor-side floating bearing side than at an opening end thereof on the turbine-side floating bearing side.

2. The turbocharger according to claim 1, wherein
the sleeve has a larger inner diameter at the axially central portion thereof than at the opening end on the compressor-side floating bearing side and at the opening end on the turbine-side floating bearing side thereof on both axial sides.

3. A turbocharger comprising:
a rotating shaft;
a compressor provided on a first end side of the rotating shaft;
a turbine provided on a second end side of the rotating shaft;
a compressor-side floating bearing that rotatably supports the rotating shaft;
a turbine-side floating bearing that rotatably supports the rotating shaft, the turbine-side floating bearing being arranged at a distance from the compressor-side floating bearing in an axial direction of the rotating shaft and arranged closer to the turbine than the compressor-side floating bearing in the axial direction of the rotating shaft; and
a bearing housing that houses the compressor-side floating bearing and the turbine-side floating bearing, the bearing housing being internally provided with a turbine-side oil feeding passage through which oil to be fed to the turbine-side floating bearing flows and a compressor-side oil feeding passage through which oil to be fed to the compressor-side floating bearing flows,
the turbocharger further comprising a first C-type retaining ring installed on the rotating shaft and contacting an end of the compressor-side floating bearing that is on the turbine-side floating bearing side,
wherein a second C-type retaining ring is installed on the rotating shaft and contacting an end of the turbine-side floating bearing that is on the compressor-side floating bearing side,
the first C-type retaining ring is installed on the rotating shaft such that a joint portion of the first C-type retaining ring is oriented to face an oil drain outlet of the housing, and
the second C-type retaining ring is installed on the rotating shaft such that a joint portion of the second C-type retaining ring is oriented to face a direction other than the direction toward the oil drain outlet of the housing.

4. The turbocharger according to claim 3, wherein
the bearing housing includes a compressor-side bearing support portion that supports the compressor-side floating bearing, and a turbine-side bearing support portion that supports the turbine-side floating bearing,
a discharge space is formed inside the bearing housing between the compressor-side bearing support portion and the turbine-side bearing support portion, the discharge space allowing oil flowing out from the first C-type retaining ring side of the compressor-side floating bearing and oil flowing out from the second C-type retaining ring side of the turbine-side floating bearing to be discharged to the drain oil outlet of the housing, and
a cutout surface portion, which extends toward the discharge space side from an inner peripheral surface to an outer peripheral surface of the compressor-side bearing support portion, is formed at a discharge outlet-side end of the compressor-side bearing support portion that is on the discharge space side.

5. A turbocharger comprising:

a rotating shaft;

a compressor provided on a first end side of the rotating shaft;

a turbine provided on a second end side of the rotating shaft;

a compressor-side floating bearing that rotatably supports the rotating shaft;

a turbine-side floating bearing that rotatably supports the rotating shaft, the turbine-side floating bearing being arranged at a distance from the compressor-side floating bearing in an axial direction of the rotating shaft and arranged closer to the turbine than the compressor-side floating bearing in the axial direction of the rotating shaft; and a bearing housing that houses the compressor-side floating bearing and the turbine-side floating bearing, the bearing housing being internally provided with a turbine-side oil feeding passage through which oil to be fed to the turbine-side floating bearing flows and a compressor-side oil feeding passage through which oil to be fed to the compressor-side floating bearing flows, wherein the compressor-side oil feeding passage includes a compressor-side oil feeding hole extending toward the compressor-side floating bearing, and a compressor-side oil feeding groove formed at an outlet-side end of the compressor-side oil feeding hole so as to extend along an outer periphery of the compressor-side floating bearing and to be open toward the outer periphery of the compressor-side floating bearing, the turbine-side oil feeding passage includes a turbine-side oil feeding hole extending toward the turbine-side floating bearing, and a turbine-side oil feeding groove formed at an outlet-side end of the turbine-side oil feeding hole so as to extend along an outer periphery of the turbine-side floating bearing and to be open toward the outer periphery of the turbine-side floating bearing, and the compressor-side oil feeding groove has a larger opening area than the turbine-side oil feeding groove.

6. The turbocharger according to claim 5, wherein the compressor-side oil feeding passage at least includes a compressor-side oil feeding hole extending toward the compressor-side floating bearing, the turbine-side oil feeding passage at least includes a turbine-side oil feeding hole extending toward the turbine-side floating bearing, and the compressor-side oil feeding hole is configured to have a larger cross sectional area than the turbine-side oil feeding hole.

7. The turbocharger according to claim 5, wherein the bearing housing includes an oil introduction path that is open in an outer surface of the bearing housing at a first end of the oil introduction path and that extends toward the rotating shaft on a second end side of the oil introduction path, to communicate with the compressor-side oil feeding passage and the turbine-side oil feeding passage, the oil introduction path is disposed at a position that is closer to the compressor-side floating bearing than to the turbine-side floating bearing in the axial direction of the rotating shaft, and the compressor-side oil feeding hole has a shorter flow path length than the turbine-side oil feeding hole.

* * * * *